April 8, 1969     B. W. DAVIS ET AL     3,437,171

MARINE HYDROPHONE VIBRATION ISOLATION

Filed Nov. 3, 1967

INVENTOR
BILLY W. DAVIS
ROY C. JOHNSTON

René E. Grossman
ATTORNEY

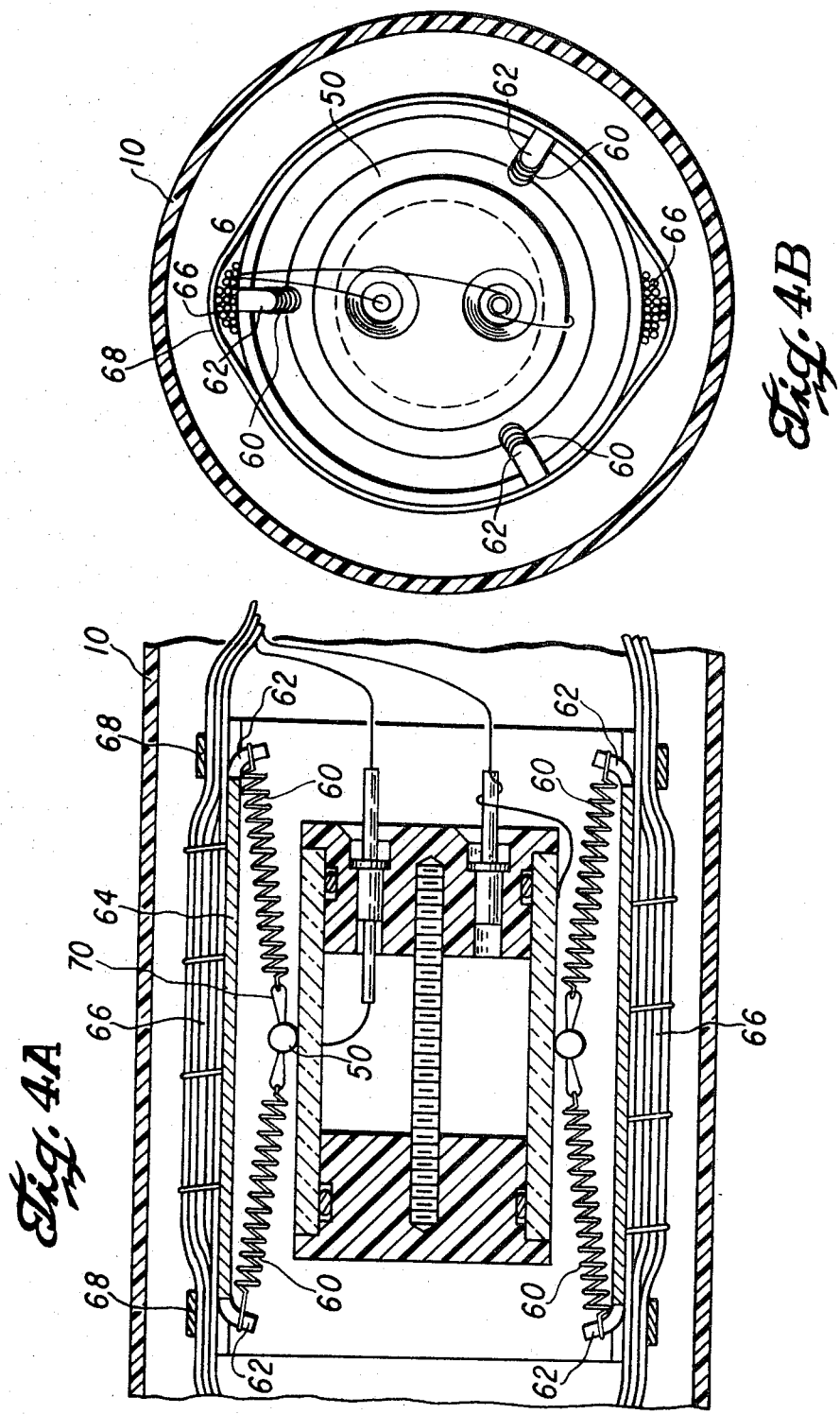

United States Patent Office 3,437,171
Patented Apr. 8, 1969

3,437,171
MARINE HYDROPHONE VIBRATION ISOLATION
Billy W. Davis and Roy C. Johnston, Richardson, Tex., assignors to Texas Instruments Incorporated, Dallas, Tex., a corporation of Delaware
Continuation-in-part of application Ser. No. 560,250, June 24, 1966. This application Nov. 3, 1967, Ser. No. 680,394
Int. Cl. F01n 1/00
U.S. Cl. 181—.5
10 Claims

ABSTRACT OF THE DISCLOSURE

A vibration isolation suspension which reduces vibrations in marine hydrophones. A lightly damped elastic suspension in a seismic streamer is used to circumferentially engage the hydrophone to substantially reduce mechanically induced noise in the seismic frequency band of interest.

---

This application is a continuation-in-part of application Ser. No. 560,250, filed June 24, 1966, now abandoned, in the name of Billy W. Davis and Roy C. Johnston and entitled "Marine Hydrophone Vibration Isolation."

This invention relates to marine seismometers or hydrophones and more particularly to a hydrophone suspension which provides vibration isolation.

Heretofore, hydrophones for use in marine seismic operations have been packaged in elongated streamers. Such streamers are towed behind a vessel for detecting seismic waves produced by detonation of an explosive charge beneath the water's surface. It has been a common experience to find that the received seismic waves are masked or distorted by vibrations created by the towing vessel and by "strumming" of the lead-in cable extending from the nose of a marine seismic cable to the towing vessel. It has been found desirable to isolate the hydrophone from such mechanically induced vibrations so that the seismic waves can be faithfully translated into electrical signals.

It is generally the practice to provide the seismic cable containing hydrophones with structure at the nose of the cable which hydrodynamically causes the cable to assume a predetermined depth of, for example, 40 feet below the surface as towing forces are applied from a boat. As a result, the lead-in cable extending from the depressor to the boat undergoes a strumming action. That is, it vibrates as a taut spring, thereby applying undesirable forces to the seismic cable.

The present invention is directed to isolation of the hydrophone from such vibrations. The tugging action of the ship, due to wave motion, as well as the strumming of the highly stressed lead-in cable as it cuts laterally through the water, constitute noise sources. Extremely minute vertical displacements of the hydrophone have been found to generate noise signals due to the hydrostatic head change. Both piezoelectric and magnetostrictive elements are employed in hydrophones as pressure sensitive devices. The acceleration forces associated with a small displacement in any direction also creates a strain on a piezoelectric crystal, for example, as to generate a significant noise signal.

It is an objective of this invention to reduce mechanically induced noise in a desired frequency band by utilizing, in a hydrophone array, a lightly damped elastic suspension. The mechanical dynamic nature of the elastic suspension is such that the physical displacement of the hydrophone reacting to a forcing function is greatly reduced or eliminated in the frequency band of interest.

More particularly, in accordance with the present invention, there is provided a hydrophone suspension in which a cylindrical pressure sensitive element is mounted in an annulus by a resilient contact ring which in turn is resiliently mounted in a cylindrical spacer which is concentric with respect to the axis of the detector. The spacer is then mounted in a streamer filled with a fluid for transmission of pressure forces to the detector with the detector isolated by the resilient mounting therefor.

In a further aspect of the invention, a secondary weight is mounted on the pressure sensitive element to modify the frequency character of the overall suspension.

For a more complete understanding of the present invention, reference may now be had to the following description taken in conjunction with the accompanying drawings in which:

FIGURE 1 diagrammatically illustrates the towing configuration of a marine seismic streamer;

FIGURES 4A and 4B illustrate, respectively, a cross-section and side view of a second embodiment of the present invention wherein a hydrophone is elastically suspended.

Figure 1:
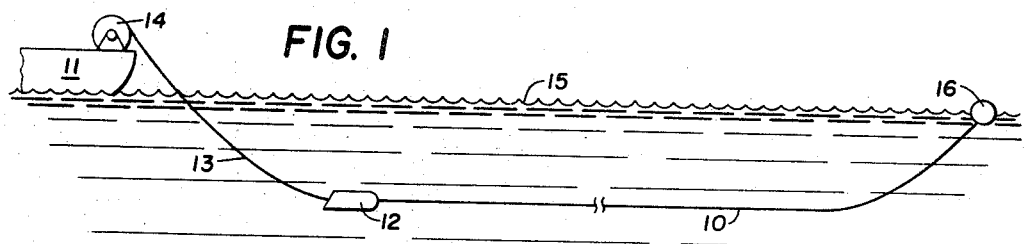

Referring now to FIGURE 1, a marine seismic streamer 10 is towed by a boat 11. A hydrodynamic depressor 12 is connected to the front end of the streamer 10. A lead-in cable 13 extends from the depressor 12 to a reel 14 carried by boat 11. Towing forces are thus applied to the streamer 10. As such forces are applied, the depressor 12 serves to maintain the cable at a predetermined depth below the surface 15. A marker buoy 16 is connected to the trailing end of the streamer 10 and serves to indicate the location of the trailing end of the streamer.

In practice, the streamer 10 may include detectors for twenty-four data channels. Each data channel may comprise ten hydrophones mounted in a flexible hollow tube of about one hundred feet in length. Signals from the hydrophones in such length are then summed and applied by way of conductors leading through the streamer and through the lead-in cable 13 to a recording system on the boat 11, whereby a multichannel seismogram can be recorded. Seismic waves detected by the hydrophones in streamer 10 are recorded as time varying electrical signals relative to the origin of a given seismic event such as the instant of detonation of an explosive charge.

In general the construction of pressure responsive marine seismic streamers is well known as represented by U.S. Patent No. 2,465,696 to Paslay.

The present invention is directed to isolation of the hydrophone from any forces other than the desired seismic waves which tend to move the hydrophone and generate unwanted noise signals.

Figure 2:
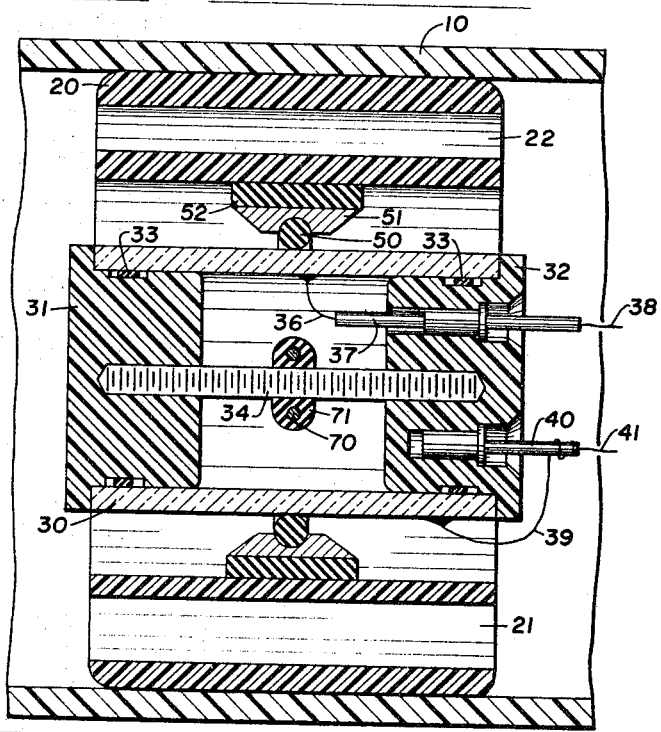
FIGURE 2 illustrates one embodiment of the present invention wherein a hydrophone is elastically suspended.

FIGURE 2 illustrates the isolation system of the present invention. In FIGURE 2 a spacer 20 is mounted in the flexible elongated streamer 10. The spacer 20 is a short hollow cylinder having peripheral bores 21 and 22 extending therethrough to accommodate cables which extend through the streamer 10 to interconnect additional units. The streamer 10 is to be filled with a transmission liquid so that pressure waves impinging the streamer will be effectively applied to elements mounted within the streamer 10. The detector element is a piezoelectric crystal 30 of cylindrical configuration. The crystal 30 is of about the same length as the length of the cylindrical spacer 20. The crystal is provided with a pair of end plugs 31 and 32 which have flanges of diameter equal to the diameter of the crystal 30 and have sections of reduced diameter extending inside of the crystal 30. O-rings 33 form seals between the plugs and the inner walls of the crystal 30. The plugs 31 and 32 are coupled together by a threaded rod 34 which is served into threaded holes in the inner ends of the plugs 31 and 32.

An electrode on the inner surface of the crystal 30 is coupled by way of a lead 36 and terminal 37 to a conductor 38 which leads to a suitable channel extending to the boat 11, FIGURE 1. Similarly, an electrode on the outer wall of the crystal 30 is connected by way of a lead 39 and terminal 40 to a conductor 41 which leads to the streamer cable.

The crystal 30 is mounted in the spacer 20 by means of an elastic suspension which preferably comprises an O-ring 50. Several segments 51 of a rigid ring or cylinder support the O-ring 50 and are mounted within the spacer 20 by pads 52 of elastic material which are spaced at uniform intervals around the inner wall of the spacer 20. The O-ring 50 serves to grip the crystal 30. The pads 52 serve as springs for suspending the crystal 30 and isolating it from the spacer 20. The O-ring 50, in one embodiment of the invention, was rubber of the quality generally employed for O-rings in mechanical sealing applications. The pads 52 preferably are neoprene foam rubber.

Figure 3:
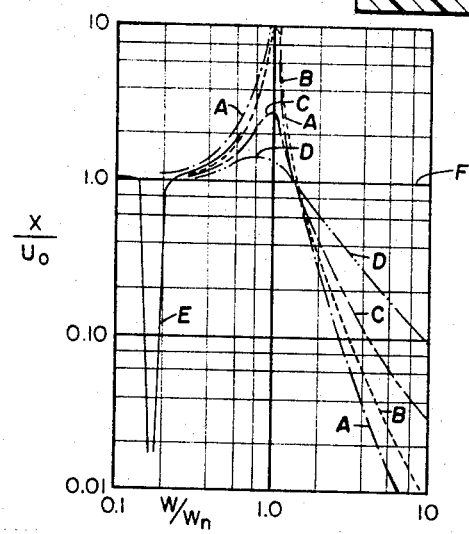
FIGURE 3 provides a comparison of the frequency response of hydrophones isolated in accordance with the present invention.

As thus far described, the hydrophone 30 is isolated from the spacer 20 by a single mass, single spring system. Such a system has been found adequate to substantially reduce mechanically induced noise in the frequency range above 35 cycles per second. Curves B, C and D of FIGURE 3 show the response for three degrees of damping. In all cases, however, the isolation from vibration extends only down to about 35 c.p.s.

It has been found difficult to build a durable hydrophone suspension system with a single mass-spring array as to have a natural frequency as low as 4 c.p.s. Such a system would be desirable to have the noise improvement begin at a low frequency of approximately 5 c.p.s., the seismic band of frequencies of interest extending from about 5 to 100 c.p.s.

In instances where such low frequency response is desired, applicants have found that a two mass-two spring suspension system is preferred. Such a hydrophone suspension may be considered to be a single degree of freedom system. This may be expressed mathematically by showing that the input to the streamer may be described as follows:

$$x = u_0 \sin wt$$

In the case of the suspension shown in the Paslay patent, where the hydrophone is coupled directly to the streamer, any motion imparted to the streamer is reproduced by the hydrophone as shown in FIGURE 3 by line F which is the steady state response for such construction. The transmissibility may be calculated from the expression:

$$\frac{x}{u_0} = \left[ \frac{1+(2hw/w_n)^2}{(1-w^2/w_n^2)^2+(2hw/w_n)^2} \right]^{1/2} \quad (1)$$

For no damping; i.e., $h=0$, Equation 1 reduces to:

$$\frac{x}{u_0} = \frac{1}{1-w^2/w_n^2} \quad (2)$$

Equation 2 is shown plotted as curves A–D in FIGURE 3. Since the frequency band of interest in seismic exploration is below 100 c.p.s., it is obvious from line F of FIGURE 3 that no effective isolation is attained by coupling a hydrophone directly to the streamer.

Now consider the effects of reducing the natural frequency of the suspension below the lowest disturbing frequency of motion imparted to the streamer. This is shown in FIGURE 3 where now the frequency band of interest, i.e., the seismic band, lies above $w/w_n=1$. Curves A, B, C and D illustrate the effect of a range of damping coefficients. Equation 1 may be used to construct curves B, C and D. Note in particular that damping is desirable only below $w=\sqrt{2}w_n$ and is actually undesirable above this frequency. The aim would be to construct a unit which has a natural resonant frequency below the seismic frequency band of interest. If this cannot be achieved then the unit should have damping such as shown by curves C or D to avoid the effect of the large excursion in curves A and B. As shown from curves A–D, the suspension is more effective above $w/w_n=\sqrt{2}$ because of its low damping coefficient.

The natural frequency of the suspension was found to be 34 c.p.s. The damping coefficient $h$ of neoprene rubber is less than 0.10 and is even less for neoprene foam rubber. Tests have confirmed the low damping coefficient and the fundamental natural frequency of approximately 30 c.p.s. In the single-degree-of-freedom system thus far described, the first harmonic is about $30\pi$ c.p.s. which would explain the upward trend in $x/u_0$ above $w/w_n \approx 3$.

From the power spectra of the output of a hydrophone, the noise level peaks below 30 c.p.s. and has been found to peak at about 10 c.p.s. The noise is much lower at the higher frequencies. In such case, the hydrophone is isolated from vibration in a particular narrow frequency band by utilizing an "auxiliary-mass" suspension. This is also shown in FIGURE 2. The steady state response of this system is found by starting with Equation 2; i.e., neglecting the effects of the auxiliary mass, and making the substitution $w_n^2 = k/m$, where $k$ and $m$ refer to the primary (or hydrophone) suspension system.

$$\frac{x}{u_0} = \left[ \frac{1+(4h^2w^2/k)m}{(1-(w^2/k)m)^2+(4h^2w^2/k)m} \right]^{1/2} \quad (3)$$

The effect of adding an auxiliary mass to the primary system may be represented by an equivalent auxiliary mass.

$$m_e = \frac{m_a}{(1-\beta_a^2)^2+(2h_a\beta_a)^2} \{[(1-\beta_a^2)+(2h_a\beta_a)^2]^2 + [2h\beta_a^3]^2\}^{1/2} \quad (4)$$

For damping in both the primary and auxiliary systems, the response $x/u_0$ may be found by adding $m_e$ (Equation 4) to the $m$'s in Equation 3 and solving. If damping is assumed to be zero in both systems ($h=h_a=0$), then the response is:

$$\frac{x}{u_0} = \frac{1-\beta_a^2}{(1-\beta_a^2)(1-\beta^2)-\beta^2\mu} \quad (5)$$

Actually, very low damping makes the system more effective provided the mass of the auxiliary system is sufficient to prevent large excursions. It is evident from Equation 5 that if the auxiliary suspension is designed so that, e.g., $f_a=10$ c.p.s., then $x/u_0=0$, if the exciting frequency $f$ is 10 c.p.s., i.e., $\beta_a=1$. The preceding discussion has assumed a single-degree-of-freedom auxiliary suspension. However, for any number degree of freedom, $x/u_0=0$, when the forcing frequency is equal to the fundamental frequency and higher harmonics of the auxiliary mass suspension. Curve E of FIGURE 3 shows a motion transmissibility curve which illustrates how the mechanically induced noise in a preselected frequency band is substantially reduced.

In accordance with the foregoing, and as shown in FIGURE 2, a mass in the form of a ring 70 is mounted on the threaded rod 34. The mass 70 is mounted coaxially on the rod 34 and is cushioned or suspended by means of a resilient body 71 such as of neoprene foam rubber. By this means the hydrophone is additionally isolated from the unwanted noise in the lower end of the frequency spectrum.

In one embodiment of the invention, the transducer 30 was made of a barium titanate material such as manufactured by Clevite Corporation of Cleveland, Ohio and identified by Catalog No. PZT5H.

The transducer 20 had a weight of 2½ oz. Three of the pads 52 were employed. They were about ½″ in diameter and 3/10″ thick. They were spaced on 120° centers. The pads 52 were of medium hardness neoprene foam of the type manufactured and sold by Rubatex Corp. of Bedford, Va. and identified by Catalog No. R411N.

This system without the auxiliary mass exhibited a resonant frequency of 34 cycles per second.

In FIGURE 2, segments 51 are shown at both top and bottom in which case an even number of rubber pads obviously are employed.

The thickness and character of pads 52 may be changed to lower or raise the resonant frequency.

FIGURE 4A illustrates a second embodiment of the isolation system of the present invention wherein parts 52 (shown in FIGURE 2) are replaced by compliant or spring means 60. Each of the spring means are connected to a tab 62 on aluminum spacer or tube 64 which encircles the hydrophone assembly; the other end of spring means 60 is connected to O-ring 50 by metal hooks 70. This tube 64 may then be positioned within spacer 20 (shown in FIGURE 2) in the same manner as thereillustrated or it may be positioned between wire bundles 66 and taped or strapped thereto by straps 68 (as shown in FIGURE 4A). This isolation system operates in the same manner as the system above described with regard to FIGURE 2. This system does not require an auxiliary mass and exhibited a resonant frequency of about 8 cycles per second. FIGURE 4B shows a side view of an assembly and illustrates three suspension means interconnected on 120° centers; however, for illustration purposes only, O-rings 50 and spring means 60 in FIGURE 4A are shown at both top and bottom in which case an even number of suspension means are employed.

While a piezoelectric unit has been described, it will be understood that a magnetostrictive or other pressure sensitive unit may also be mounted for vibration isolation.

What is claimed is:

1. A marine seismometer mounting for vibration isolation which comprises:
    (a) a cylindrical pressure responsive transducer,
    (b) a flexible cylindrical streamer for enclosing said transducer,
    (c) a cylindrical spacer engaging the inner walls of said streamer and encompassing said transducer,
    (d) mounting means for maintaining said transducer, coaxially oriented within said streamer and spaced from the walls thereof and including means resiliently to grasp the outer surface of said transducer circumferentially at a midpoint thereof and for resiliently engaging the inner wall of said spacer, and
    (e) an auxiliary mass resiliently supported on said transducer, said mass being substantially mechanically isolated from said cylindrical streamer, wherein the resonant frequency of said transducer and said auxiliary mass taken together is of one frequency in the low end of the seismic frequency band and the resonant frequency of said auxiliary mass relative to said transducer is at a different frequency and lower in the seismic frequency band.

2. A marine seismometer mounting for vibration isolation which comprises:
    (a) a short cylindrical piezoelectric pressure transducer,
    (b) a hollow cylindrical spacer adapted to be mounted inside of a flexible seismic streamer tube,
    (c) rigid ring segments of diameter intermediate the inside diameter of said spacer and the outer diameter of said transducer with an O-ring on the inside of said rigid ring segments engaging the outer surface of said transducer at a point midway of the length thereof, and
    (d) resilient pad means engaging the outer wall of said rigid ring in the inner wall of said spacer for vibration isolation of said transducer relative to said spacer.

3. The combination set forth in claim 2 wherein said transducer is provided with a pair of inwardly extending end plugs coupled together by a rigid rod and wherein an auxiliary mass is resiliently mounted within said transducer on said rod between said end plugs.

4. The combination set forth in claim 2 wherein the resonant frequency of said transducer and said auxiliary mass relative to said spacer is of a first frequency in the low end of the seismic frequency band and the resonant frequency of said auxiliary mass relative to said transducer is at a different and lower frequency in the seismic frequency band.

5. A marine seismometer mounting for vibration isolation which comprises:
    (a) a streamer tube,
    (b) a rigid cylinder in said tube,
    (c) a cylindrical pressure sensitive transducer mounted coaxially within said tube and said rigid cylinder,
    (d) first resilient means engaging the outer wall of said transducer,
    (e) second resilient means engaging the inner wall of said rigid cylinder,
    (f) a rigid member coupling said first and second resilient means, and
    (g) circuit means coupled to said transducer and extending through said tube.

6. A marine seismometer mounting for vibration isolation which comprises:
    (a) a cylindrical pressure responsive transducer,
    (b) rigid means circumferentially encompassing said transducer and spaced therefrom, and
    (c) support means including an O-ring resiliently to grasp the outer surface of said transducer circumferentially at a midpoint thereof and a different resilient means for resiliently engaging said rigid means.

7. The combination set forth in claim 6 wherein an auxiliary mass is resiliently supported on said transducer and wherein the resonant frequency of said auxiliary mass relative to said transducer differs from the resonant frequency of said transducer and said auxiliary mass.

8. A marine seismometer mounting for vibration isolation which comprises:
    (a) a cylindrical pressure responsive transducer,
    (b) a flexible, cylindrical streamer for enclosing said transducer,
    (c) a hollow cylindrical spacer encircling said transducer and adapted to be mounted inside of said streamer,
    (d) mounting means for maintaining said transducer coaxially oriented within said streamer and spaced from the walls thereof and including means to grasp the outer surface of said transducer circumferentially substantially at the midpoint thereof and compliance means engaging the inner wall of said tube and said grasping means.

9. A marine seismometer mounting for vibration isolation which comprises:
    (a) a cylindrical pressure responsive transducer,
    (b) a hollow cylindrical spacer encircling said transducer and adapted to be mounted inside of a flexible seismic streamer,
    (c) O-ring means engaging the outer surface of said transducer substantially at a point midway of the length thereof, and
    (d) spring means interconnecting between said O-ring means and said tube.

10. The combination set forth in claim 9 wherein the O-ring and spring means are spaced on 120° centers around said transducer.

References Cited
UNITED STATES PATENTS 3,371,311   2/1968   Cholet et al.
3,382,481   5/1968   Baker.

BENJAMIN A. BORCHELT, *Primary Examiner.*
GERALD H. GLANZMAN, *Assistant Examiner.*

U.S. Cl. X.R.

340—10